United States Patent
Volkmer

(10) Patent No.: US 8,170,810 B2
(45) Date of Patent: May 1, 2012

(54) METHOD FOR MONITORING THE LOAD ON ROTOR BLADES OF WIND ENERGY INSTALLATIONS

(75) Inventor: Peter Volkmer, Dresden (DE)

(73) Assignee: Igus_Innovative Technische Systeme GmbH, Dresden (DE)

( * ) Notice: Subject to any disclaimer, the term of this patent is extended or adjusted under 35 U.S.C. 154(b) by 609 days.

(21) Appl. No.: 12/299,802

(22) PCT Filed: May 15, 2007

(86) PCT No.: PCT/DE2007/000881
§ 371 (c)(1),
(2), (4) Date: Apr. 14, 2009

(87) PCT Pub. No.: WO2007/131489
PCT Pub. Date: Nov. 22, 2007

(65) Prior Publication Data
US 2009/0319199 A1 Dec. 24, 2009

(30) Foreign Application Priority Data
May 15, 2006 (DE) .................. 10 2006 022 884

(51) Int. Cl.
*G06F 19/00* (2011.01)
(52) U.S. Cl. .......... 702/41; 702/141; 702/142; 702/150; 290/44; 416/31; 416/147
(58) Field of Classification Search .................. 702/150, 702/41, 141, 142; 290/44, 55, 54, 43; 416/31, 416/1, 147, 37; 700/287, 42, 280
See application file for complete search history.

(56) References Cited

U.S. PATENT DOCUMENTS 6,619,918 B1 * 9/2003 Rebsdorf ........................ 416/1
6,876,099 B2 * 4/2005 Wobben ........................ 290/44
(Continued)

FOREIGN PATENT DOCUMENTS
DE 10065314 A1 7/2002
(Continued)

OTHER PUBLICATIONS

International Search Report for PCT/DE2007/000881, dated Sep. 24, 2007.
(Continued)

*Primary Examiner* — Carol Tsai
(74) *Attorney, Agent, or Firm* — Heslin Rothenberg Farley & Mesiti P.C.

(57) ABSTRACT

In a method for monitoring the load on rotor blades of wind energy installations by measuring acceleration on at least one rotor blade of a wind energy installation and determining load on the rotor blade from the picked-up acceleration signals, dynamic, even uncritical load states can be detected, in differentiated fashion, and combined in a suitable form for evaluation in order to influence, if possible prior to the onset of damage to the rotor blade, the mode of operation of the wind energy installation, in particular the design of the pitch control or angle setting of stall-regulated rotor blades, on the basis both of all of the rotor blades together and of a single rotor blade. Frequency of occurrence of the load values over a certain period of time is determined from amplitudes of the acceleration signal or amplitudes of selected natural oscillations of the frequency spectra are obtained by Fourier transformation.

13 Claims, 3 Drawing Sheets

U.S. PATENT DOCUMENTS

Figure 1:
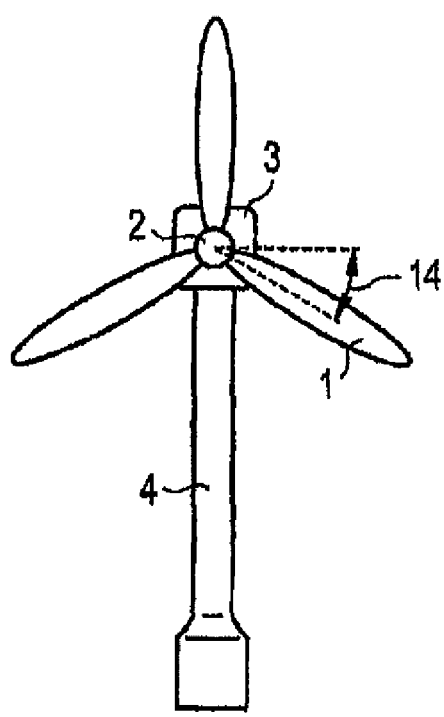

| | | | |
|---|---|---|---|
| 6,940,186 B2 * | 9/2005 | Weitkamp | 290/44 |
| 7,086,834 B2 * | 8/2006 | LeMieux | 416/1 |
| 7,238,007 B2 * | 7/2007 | Wobben | 416/5 |
| 7,317,260 B2 * | 1/2008 | Wilson | 290/44 |
| 7,883,319 B2 * | 2/2011 | Volkmer | 416/61 |
| 2004/0108729 A1 * | 6/2004 | Wobben | 290/44 |
| 2005/0276696 A1 * | 12/2005 | LeMieux | 416/61 |
| 2006/0033338 A1 * | 2/2006 | Wilson | 290/44 |
| 2008/0206052 A1 * | 8/2008 | Volkmer | 416/61 |
| 2009/0004005 A1 * | 1/2009 | Jeppesen et al. | 416/44 |
| 2011/0040413 A1 * | 2/2011 | Jeppesen et al. | 700/275 |

FOREIGN PATENT DOCUMENTS

| | | |
|---|---|---|
| WO | WO9936695 A | 7/1999 |
| WO | WO02075153 A | 9/2002 |

OTHER PUBLICATIONS

Jeffries WQ et al, "Experience with Bicoherence of Electrical Power for Condition Monitoring of Wind Turbine Blades", IEE Proceedings: Vision, Image and Signal Processing, Institution of Electrical Engineers, GB, Bd. 145, NR. 3, Jun. 24, 1998, Seiten 141-148 XP006011570, ISSN: 1350-245X.

* cited by examiner

METHOD FOR MONITORING THE LOAD ON ROTOR BLADES OF WIND ENERGY INSTALLATIONS

CROSS REFERENCE TO RELATED APPLICATIONS

This application is a national stage filing under section 371 of International Application No. PCT/DE2007/000881, filed on May 15, 2007, and published in German on Nov. 22, 2007, as WO 2007/131489 A1, and which claims priority of German application No. 10 2006 022 884.7, filed on May 15, 2006, the entire disclosure of these applications being hereby incorporated herein by reference.

BACKGROUND ART

The invention relates to a method for monitoring the load on rotor blades of wind energy installations by means of acceleration measurements on at least one rotor blade during the operation of the wind energy installation and to the determination of evaluation variables for assessing the load on the rotor blade from the acceleration signals picked up.

Rotor blades are among the most highly loaded components of a wind energy installation. They should withstand the enormous centrifugal forces, wind streams and gusts, turbulences, solar irradiation, the most varied temperatures and ice aggregation over a number of years in continuous operation in order to provide for economic operation of the wind energy installation.

Rotor blades, therefore, are also among the components having the highest failure rates. Repairs and the exchange of rotor blades which is still most often carried out at present, are very cost-intensive and cause long periods of lack of income. For this reason, the early detection of damage in the various components of the rotor blade, particularly in the aerodynamic shell of the rotor blade and in its supporting components in the interior of the rotor blade is necessary.

Indicating the damage event provides important information for damage prevention and preventative maintenance. However, it is more productive to detect and indicate the possible causes of damage events. This includes especially dynamic overloads which arise due to strong changes in the wind or turbulences and strong winds and lead to the rotor blades being loaded beyond the design load and can be damaged, as a result. The dynamic loads are alternating loads with high rates of change which therefore are a main cause of rotor blade damage.

Dynamic overloads can also be produced if the rotor blades are not aerodynamically equal or matched to one another, e.g. the pitch control is not appropriate for one blade.

Such conditions must therefore be absolutely avoided. As a rule, the pitch control of the rotor blades, or, in so-called stall-controlled installations in which the rotor blades have a fixed angle setting carried out during their erection, the basic setting of the rotor blades, are responsible for correcting the said or comparable events in such a manner that the overloads do not occur.

It is therefore important to determine the dynamic overloads in order to detect and remedy existing control errors or, respectively, to optimize the pitch control from the findings relating to the dynamic overloads. In the same way, the basic adjustment of stall-controlled wind energy installations can be checked and adapted.

Methods and arrangements have hitherto become known in which strains at particular points in the rotor blades are measured by means of strain gauges and optical fiber systems having the same effect in order to detect and evaluate from these load states for an entire rotor blade in each case. The load states measured in this approach are basically not alternating loads but only quasi-static loads having low rates of change. However, strain gauges have problems in continuous use and are difficult to exchange with constant positioning. On the other hand, measurements of strains with optical fibers are expensive and irreparable when they are destroyed due to excessive strains.

The measurement of accelerations in the rotor blade by means of acceleration sensors is more advantageous as described, for example, in the patent document EP 1 075 600. In principle, the acceleration value already provides load-related information and, in addition, acceleration sensors are comparatively inexpensive and long-lasting and can be exchanged without problems in the case of damage.

For a preventative repair, the type of damage of rotor blades is determined more precisely in DE 100 65 314 A1. For this purpose, non-critical damages to the individual rotor blades are also determined from the determination of the resonant and natural frequencies which are generated in the rotor blades by means of vibration excitation and their comparison with provided reference spectra, characterizing defined damage states. In this context, it is found to be a disadvantage, however, that the damaging events are considered as single events but the fatigue of the material of the rotor blade due to frequently occurring, actually non-critical events is only considered if it has led to damage. The invention is therefore based on the objective of specifying a method by means of which dynamic, also non-critical load states can be detected in the differentiated manner and combined in a suitable form for evaluation in order to influence, if possible prior to the onset of damage to the rotor blade, the mode of operation of the wind energy installation, in particular the design of the pitch control or angle setting of stall-controlled rotor blades, on the basis both of all the rotor blades together and of a single rotor blade.

This object is achieved by means of a method which has the features of claim 1.

BRIEF SUMMARY OF INVENTION

The method according to the invention makes it possible to determine both absolute limit-value information and the frequency of dynamic load states occurring at the rotor blade, the main attention being paid to the detection of less frequent dynamic load states which, however, are more critical per se. Limit-value accumulations of such states are detected by continuously registering and evaluating short-term single events.

The findings can be obtained both individually for each rotor blade, which, in turn, allows conclusions with respect to possibly wrong adjustments of the pitch angle or the basic settings for individual rotor blades. However, the method also provides information about all rotor blades of a wind energy installation, e.g. by means of comparison of the loads occurring at individual rotor blades with regard to the correspondence of the pitch angle or basic adjustment of all rotor blades. The analysis of the comparison can be used, e.g. for evaluating the efficiency of the pitch control.

The dynamic overloads can be derived, on the one hand, directly from the acceleration amplitudes of the natural frequencies also of higher modes and, on the other hand, directly from the acceleration/time signal. A so-called hit which indicates an overload is represented, e.g. as a group of needle pulses in the acceleration/time signal and can be included in the evaluation via the resultant characteristic values.

To evaluate the recorded loads and frequencies, these are compared with a distribution which characterizes the normal operation which was recorded on a wind energy installation in undisturbed operation.

Since apart from the main directions of load in the buffet and turn direction, loads also occur in other directions of vibration, e.g. torsion vibrations, it is also advantageous to have these available in differentiated and assessable manner.

The frequency distribution of the load states recorded by means of this method indicates a particularly high frequency for the load values normally associated with the operation due to the winds driving the wind energy installation, for which it was designed. Other peaks in the frequency distribution point towards other load values which occur time and again. Which of these lead, at which frequency, to a limit load requiring an exertion of influence on the operation of the wind energy installation, a change in control, particularly the pitch control, or maintenance can be established from reference considerations, from simulations and/or the association of the monitoring method according to the invention with those methods in which changes in the characteristics of the rotor blade and the type of a damage which has occurred and its location is inferred from the changes in the vibration behavior, as described, for example, in DE 100 65 314 A1.

An association with this method is advantageous even for the reason that it also carries out the measurement of accelerations on the rotor blade so that its measuring system can be used at the same time for the method according to the invention.

The limit values specified by the rotor blade manufacturer, which are based on the characteristics of the material and of the type and reliability of the connections between the individual components are of special significance in the evaluation of the frequency of loads occurring. These values are always dimensioned in such a manner that individual slight excesses do not yet lead to damage on the rotor blade. Using the method according to the invention, however, more frequent transgressions of the limit value of the manufacturer can be recorded and evaluated so that damaging material fatigue in the components or their connections can be established.

Due to the loads, occurring quite differently, with different load values located closely together, it is advantageous to combine areas of the load values into load classes and to determine the frequency of occurrence of loads which are to be allocated to the individual classes.

The load value can be determined, for example, from the amplitude of one or more defined natural frequencies of the rotor blade, e.g. the first buffet and turn frequency. For this purpose, a frequency/amplitude spectrum is determined by means of a fast fourier transform from a time-dependent signal received by means of an acceleration sensor. The generation and the measurement of the signal and its evaluation for determining the frequency/amplitude spectrum can be effected, for example, by means of the method described in DE 100 65 314 A1 and the corresponding arrangement, the content of which is referred to expressly at this point.

In accordance with the determination of the frequency distribution of discrete load values or of load classes, represented above, the acceleration/amplitude values which form the basis of the determination of the load, or correspondingly formed acceleration/amplitude classes, can also be used directly for the monitoring of rotor blades according to the invention. Due to the direct relationship between the load occurring and the measured acceleration amplitude of the selected natural frequency, it is also possible to define one or more limit values of the frequency of the occurrence of an amplitude or amplitude class as limit load.

The distributions are also used in order to establish whether the pitch control as a whole, and also with reference to the single blade, operates correctly.

The distributions, recorded over relatively long periods of time, also represent the load history for the rotor blade and can be utilized for determining damage causes.

BRIEF DESCRIPTION OF THE DRAWING FIGURES

The method and the device required for it will be explained in an exemplary embodiment of a wind energy installation with three rotor blades. The associated drawing shows in FIG. 1 the schematic overall view of a wind energy installation, FIG. 2 the schematic representation of a rotor blade, FIG. 3 a schematic block circuit diagram of the method according to the invention and FIG. 4 the frequency distribution of the relative load on three rotor blades of a wind energy installation, subdivided into four load classes.

DETAILED DESCRIPTION

FIG. 1 shows the overall view of a wind energy installation with three rotor blades 1 which are mounted on a hub 2. The hub 2, in turn, passes into a horizontally supported shaft. The shaft ends in a nacelle 3 which comprises the engine technology, not shown in greater detail, and is arranged rotatably around a vertical axis at the upper end of a tower 4.

Figure 2:
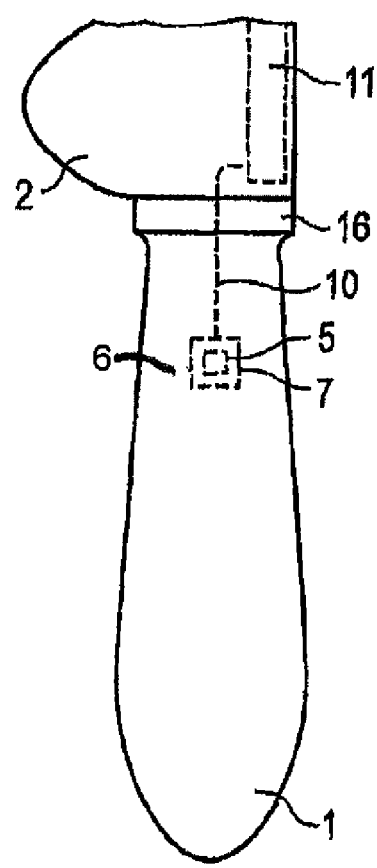
Figure 3:
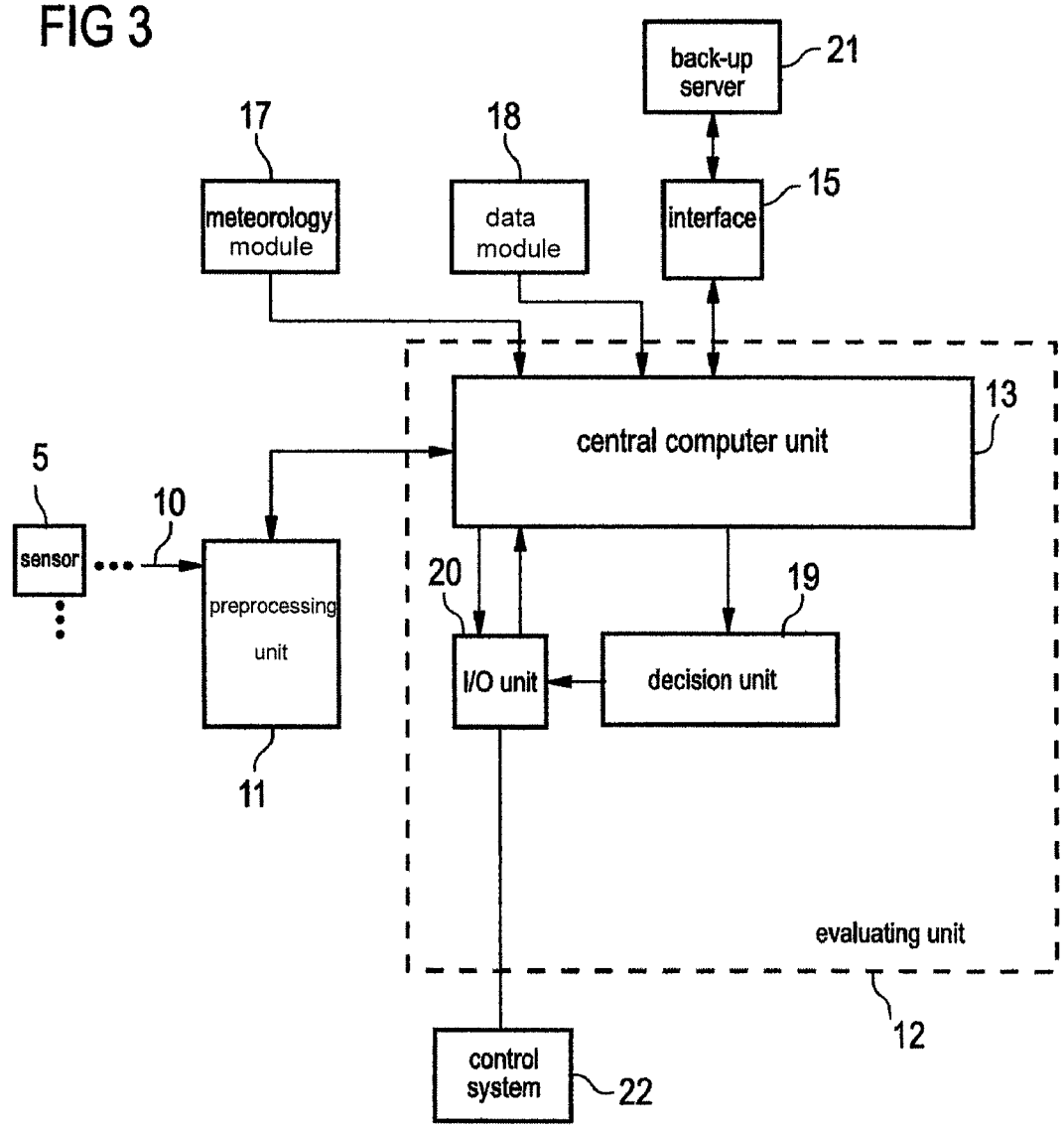

According to FIG. 2, in the exemplary embodiment shown, two one-dimensional acceleration sensors 5 having a mutually deviating direction of acceleration are firmly mounted, e.g., by a mounting plate 7, on the aerodynamic shell 6 of the rotor blade 1 on an inner surface of the large-area free aerodynamic shell 6 of a rotor blade 1 in its lower third facing the rotor blade foot 16 according to FIG. 2. In the present exemplary embodiment, an acceleration sensor 5 with X-alignment for measuring the flexural vibrations extending parallel to the surface of the aerodynamic shell 6, and an acceleration sensor 5 with Z alignment for measuring the flexural vibrations directed perpendicularly to the surface are arranged. By this means, the loads in the buffet and in the turn direction can be monitored, and also the loads which result from torsional vibrations by combining the two sensor signals. The two acceleration sensors 5 can also be arranged spatially separately from one another. As an alternative to using two acceleration sensors 5, it is also possible to mount three, one each for the X, Y and Z direction.

The acceleration sensors 5 are connected via a cable 10 running in the interior of the rotor blade 1 to a sensor supply and measurement value preprocessing unit 11 which is located in the hub 2. The other two rotor blades of the wind energy installation are equipped with in each case further acceleration sensors which are also connected by cable to the sensor supply and measurement value preprocessing unit 11.

The sensor supply and measurement value preprocessing unit 11 is connected by means of wireless transmission, e.g. by means of radio transmission, to an evaluating unit 12, not shown in greater detail in FIG. 2, which is located in the nacelle 3 or in the base of the tower 4 and, as a rule, is networked with other computers 21 via an interface 15. The device also comprises an operating data module 18 and a meteorology module 17 which are also not shown in greater detail and are located in the nacelle 3, in the tower 4 or another location suitable for acquiring these data.

In the text which follows, the measurement performed on a rotor blade 1 of a wind energy installation which is in operation will be described.

The vibration excitation required for the measurement occurs due to the operation per se and the wind engaging the rotor blade 1 during this process. Due to this continuous vibration excitation, the sensors 5 mounted on the aerodynamic shell 6 of the rotor blade 1 deliver electrical analog signals as time-related amplitude signals which are conducted via the cables 10 to the sensor supply and measurement value preprocessing unit 11 in the hub 2.

In the sensor supply and measurement value preprocessing unit 11 which, at the same time, is used for supplying the sensors, the signals are digitized, transmitted by radio to the evaluating unit 12 which has a central computer unit 13 (FIG. 3), and the measurement is also controlled here in order to ensure reliable control independently of the radio transmission between the sensor supply and measurement value preprocessing unit 11 and the central computer unit 13. In the central computer unit 13, frequency-dependent acceleration values are obtained per measuring cycle and for each rotor blade 1 from the recorded time signals by means of fourier transform. The first natural frequency of the nth rotor blade 1, and thus the acceleration amplitude and from this the load is determined at this frequency by means of suitable methods.

In this manner, frequency-dependent amplitude spectra, and from these the load at the first natural frequency, are also obtained in parallel from the other rotor blades 1 of the wind energy installation. These determined loads of each measuring cycle are determined for the abovementioned different directions of acceleration, and evaluated, in accordance with the sensor or sensors 5 used.

In the central computer unit, the numeric values of the loads from each of the measuring cycles of the sensors 5, carried out virtually continuously, are allocated to a load class. The load classes are defined by load limit values which have been obtained from empirical values during the assessment of rotor blade states and are specified in accordance with the requirements and possibilities of influencing the operation of the wind energy installation. Thus, e.g., the class setting for stall-controlled wind energy installations will differ from that for pitch-controllable installations and contain at least one class for normal dynamic load events, a class for increased but still permissible dynamic load events and one class each for dynamic load events which require the issuing of a warning and of an alarm.

Figure 4:
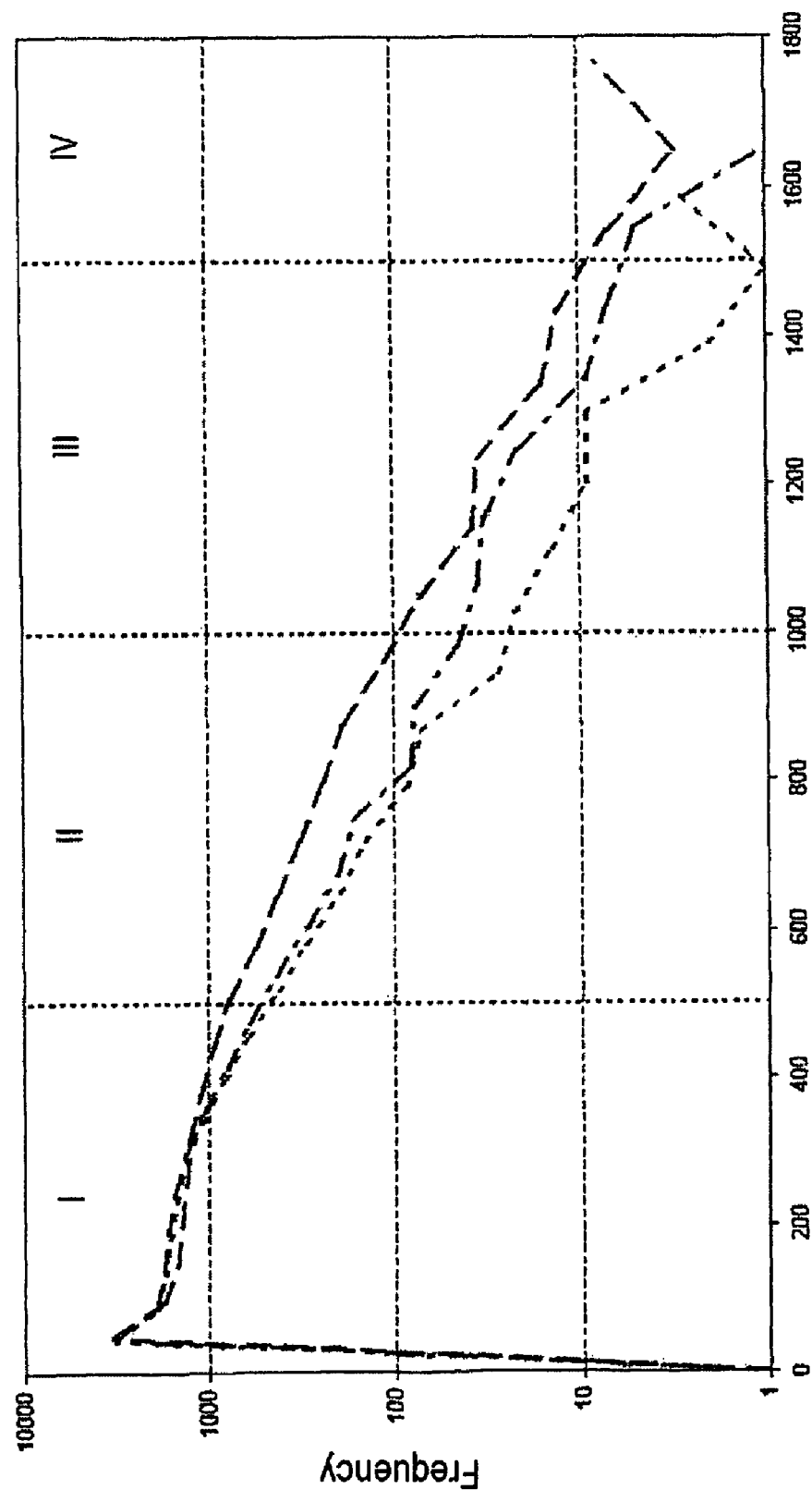

Each amplitude represents a load event which is evaluated as more or less critical with its allocation into the load classes. The events obtained from the continuous measurements and evaluated are summed with reference to classes so that the frequency of the events per class is determined for each rotor blade 1 over a defined period of time or a defined number of events (FIG. 4). To evaluate the influence of accumulated events on the state of a rotor blade 1, its events of a class are referred to the total number of events for this rotor blade 1.

FIG. 4 represents in each case a frequency distribution of load events of the three rotor blades 1 of a wind energy installation which were determined in the course of a month. The load values were normalized with other wind energy installations and with empirical values obtained earlier, to provide comparability, and represent relative values. The frequency of the events is referred to the total number of events of 10000 and determined slidingly with continuing measurement.

In FIG. 4, load class I represents the events with normal load, i.e. with average weather and operating conditions. As expected, their frequency is the greatest. Load class II covers events which originate from an increased but still permissible dynamic load. Their frequency is less than that of the events of load class I. The events of load class III are based on increased dynamic loads which are evaluated as critical even with a low proportion of the total number of events and accordingly can result in measures for protecting the operation of the wind energy installation. For example, such measures can be the selective search for possible damage or planning for medium-term maintenance or also a correction of the pitch angle of a rotor blade 1 or of all rotor blades 1 of the installation. Events of load class IV, in contrast, must already be assessed as critical in themselves or at least with a very low frequency, in such a manner that the operation of the installation must be influenced immediately, e.g. by turning it off or by pitch control. As expected, the established frequency of the events of these two last-mentioned load classes is in each case distinctly lower than that of the in each case adjacent lower load class.

In the exemplary embodiment, the course of the frequency distributions of the three rotor blades 1 is comparable so that it can be concluded that there is no individual damage of only one blade and the pitch control of all rotor blades 1 is also within the bounds of permissible tolerances.

Allocating a particular frequency of a defined range of values of the load to a rotor blade state is carried out on the basis of empirical values which can be deposited as reference value in the evaluating unit. On the basis of this correlation, a decision for influencing the operating mode of the wind energy installation is made or the operating mode is immediately changed when the reference value is reached or exceeded.

For this purpose, a signal is transmitted to an operational decision module 19 (FIG. 3) and a corresponding status message is generated when a permissible frequency value is exceeded. The status message, in turn, is conveyed to an input and output unit 20 which is part of the evaluating unit 12 and comprises, e.g. a binary output module via which the status messages can be transferred to the installation control system 22 in a redundant, intrinsically and externally safe manner. Visualization of the measured data, of the stored and of the event-related data is also implemented via the input and output unit 20 or also via the back-up server 21 which can be accessed by an authorized user via a web browser.

As an alternative to detecting the frequency of load values, the amplitude values of the measured time-related acceleration can also be used for assessing the load on the individual rotor blades and the entire installation. In this context, the amplitude values are underlayed with defined load values for their evaluation with respect to the state of a rotor blade or the entire installation but the evaluation is done directly by means of the amplitude values. These are determined directly from the time-related acceleration values and evaluated in the manner described above with regard to the frequency of their occurrence in order to determine the loads accumulated over a defined period of time, and thus the state of one or more rotor blades of a wind energy installation. For this purpose, a maximum amplitude value of the time-dependent acceleration values recorded within a measuring cycle is determined as amplitude value. With regard to the further evaluation of the amplitude values, reference is made to the above statements.

In various applications, it may be required to determine the load on the rotor blades independently of the structure-borne sound signals which are transmitted to the rotor blades 1 from the drive train of the wind energy installation. In this case, structure-borne sound measurements of the rotor blades 1 can be determined in parallel in the manner described above using one or preferably several one- or multi-dimensional sensors 5, and evaluated. The spectra from the measurements on the rotor blades 1 are then corrected using these interference spectra.

In addition, during the status measurement of the rotor blade 1, current measurement values can be conveyed by the system itself, a meteorology module 17 and operating data module 18 to the central computer unit 13, such as, for example, temperature of the rotor blade 1, the power of the wind energy installation or, as substitute, the wind velocity and operating period of the respective rotor blade 1. Thus, particular external or installation-specific influences can be allocated to load values defined in the evaluation of a measuring period.

The obtained data of the measuring cycles of the central computer unit 13 are stored in a back-up server 21 independent of the central computer unit 13, which, in turn, is integrated in a database, in certain fixed periods and in the case of events immediately and via a suitable interface 15 by means of remote data transmission.

The invention claimed is:

1. A method for monitoring load on rotor blades of wind energy installations, comprising:
   measuring accelerations on at least one rotor blade of a wind energy installation and generating corresponding acceleration signals, and
   determining the load on the at least one rotor blade from the acceleration signals, by employing frequency-dependent acceleration values or resultant acceleration amplitudes of certain natural frequencies derived from the acceleration signals as individual load values, and determining and evaluating a frequency of occurrence distribution of the individual load values over a particular period of time.

2. The method for monitoring the load on rotor blades as claimed in claim 1, wherein a limit load and a frequency value or a distribution of a predefined load value is determined, on the reaching or transgression of which a decision is made about further operating mode of the wind energy installation.

3. The method for monitoring the load on rotor blades as claimed in claim 2, wherein the decision about the further operating mode of the wind energy installation relates to turning-off the installation.

4. The method for monitoring the load on rotor blades as claimed in claim 2, wherein the decision about the further operating mode of the wind energy installation relates to influencing a control algorithm of a pitch control.

5. The method for monitoring the load as claimed in claim 1, wherein the individual load values are determined from amplitudes of at least one natural frequency of a first vibration mode of the at least one rotor blade.

6. The method for monitoring the load as claimed in claim 5, wherein the natural frequency of a vibration mode which is higher than the first vibration mode is determined.

7. The method for monitoring the load as claimed in claim 1, wherein the frequency distributions are determined for at least two rotor blades of a wind energy installation and are compared with one another.

8. The method for monitoring the load as claimed in claim 1, wherein evaluation of the amplitudes is used for influencing control of the wind energy installation when limit values are exceeded.

9. The method for monitoring the load as claimed in claim 8, wherein said control comprises changing pitch in order to reduce overload.

10. The method for monitoring the load as claimed in claim 1, further comprising:
    mounting at least one acceleration sensor on an aerodynamic shell of the at least one rotor blade, the at least one acceleration sensor generating the acceleration signals.

11. The method for monitoring the load as claimed in claim 9, further comprising:
    transmitting the acceleration signals to an evaluating unit, and
    employing a central computer unit of the evaluating unit to determine the load on the at least one rotor blade from the acceleration signals.

12. A method for monitoring load on rotor blades of wind energy installations, comprising:
    measuring accelerations on at least one rotor blade of a wind energy installation and generating corresponding acceleration signals, and
    determining the load on the at least one rotor blade from the acceleration signals by employing frequency-dependent acceleration values or resultant acceleration amplitudes of certain natural frequencies derived from the acceleration signals as individual load values, and determining and evaluating a frequency of occurrence distribution of the individual load values over a particular period of time, wherein loads possibly occurring are subdivided into a sequence of limited ranges of load values referred to as load classes and frequency of occurrence of the load classes is determined, a limit load being determined as frequency value of a predefined load class.

13. A method for monitoring load on rotor blades of wind energy installations, comprising:
    measuring accelerations on at least one rotor blade of a wind energy installation and generating corresponding acceleration signals, and
    determining the load on the at least one rotor blade from the acceleration signals by employing frequency-dependent acceleration values or resultant acceleration amplitudes of certain natural frequencies derived from the acceleration signals as individual load values, and determining and evaluating a frequency of occurrence distribution of the individual load values over a particular period of time,
    wherein the individual load values are determined from amplitudes of at least one natural frequency of a first vibration mode of the rotor blade, and
    wherein amplitudes possibly occurring are subdivided into a sequence of limited ranges of amplitude values referred to as amplitude classes, and frequency of occurrence of the amplitude classes is determined, a limit load being determined as frequency value of a predefined amplitude class.

* * * * *